United States Patent Office 3,256,961
Patented June 21, 1966

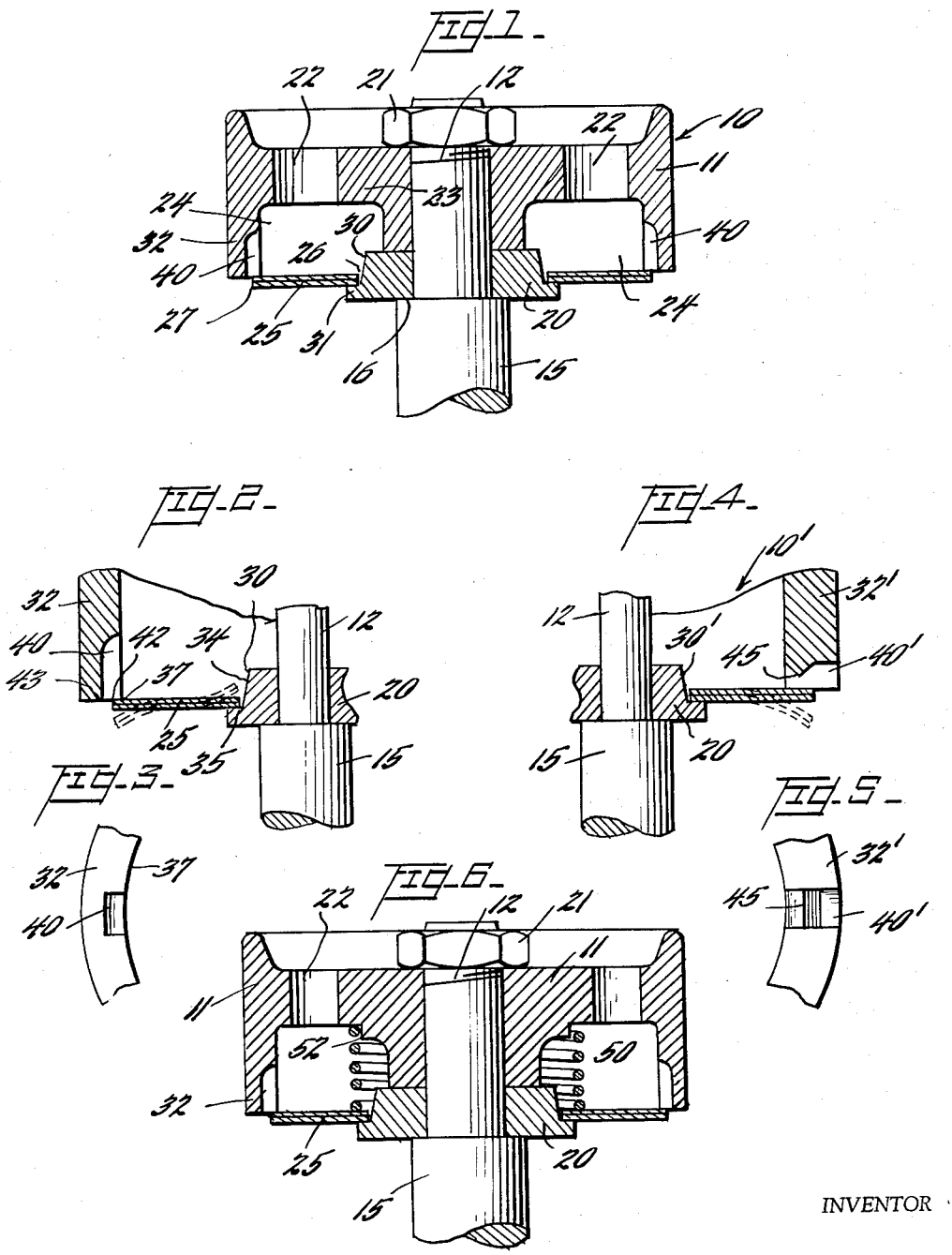

3,256,961
VALVED PISTON WITH BLEED
Christian M. L. L. Bourcier de Carbon, 64 Blvd. Maurice-Barres, Neuilly-sur-Seine, France
Filed Aug. 26, 1964, Ser. No. 392,266
Claims priority, application France, Apr. 26, 1962, 895,729; Jan. 7, 1964, 959,492
3 Claims. (Cl. 188—88)

The present application is a continuation-in-part of my copending applications Serial No. 229,386, filed October 9, 1962, now abandoned, and Serial No. 275,767, filed April 25, 1963, now Patent No. 3,199,636.

This invention relates to flow controlling valving for the pistons of hydraulic shock absorbers, and more particularly of such shock absorbers as are applicable to motor vehicles or the like.

Certain features of novelty of this generic development are covered in these copending applications, and other features including the particular advantageous shaping of the margins of the valve orifices as well as other attendant features, constitutes the principal subject matter of this present aspect of the invention.

It will be recalled that this development features the provision of valves constituted of thin annular plates either singly or in a pack, the valves being disposed between two seating portions of the internal structure of the working piston, the edge of the inner opening cooperating with one of the seat portions on which one of the valve faces rests, and the edge of the external periphery of the valve disc cooperates with the other seating portion. In such pistons, of course, the operation in controlling flow of damping liquid in both directions is provided by a single valve. One of the important features of this type of installation is that the thin laminar valve plates or discs are not subjected at any point to any gripping, embedment, or close housing, these annular discs having no portion immobilized, which justifies the designation "floating valve."

The invention covered herein and also disclosed in my copending applications, also involves the provision of progressively opening orifices at the edges of the valve discs causing discharge of the liquid in the form of thin laminar sheets which point toward turbulence-free discharge through the piston.

A more particular object of the present invention as claimed herein is the provision of discharge of damping liquid between spaced rather sharp edges or corners which constitute the boundaries of the fluid orifices. As will be developed further in the present specification, the orifices should be extremely narrow or thin in cross-section and the length of the restricted section should be as short as possible, approaching zero. Thus, the orifices of variable capacity can be between a sharp edge or corner on the one side and a plain surface on the other, or actually between two opposed sharp surfaces or corners, whether provided by one of the controlling edges of the valve disc or by certain structural features of the seating portions carried by the piston proper.

Other objects and features of novelty will be apparent from the following specification, when read in connection with the accompanying drawings in which certain embodiments of the invention are illustrated by way of example.

In the drawings:
FIGURE 1 is a view in diametric vertical section of a piston embodying the principles of the invention;
FIGURE 2 is a fragmentary enlarged view of the piston shown in FIGURE 1;
FIGURE 3 is a fragmentary bottom plan view of the skirt of the piston;
FIGURE 4 is a fragmentary view of a piston comprising another embodiment of the invention;

FIGURE 5 is a fragmentary bottom plan view of the skirt of the piston shown in FIGURE 4; and
FIGURE 6 is a further modified embodiment showing the addition of a spring bearing upon the inner periphery of the disc.

Before describing the exemplary embodiments of the invention in detail it would be well to mention certain aspects of the prior art in which annular valve discs have been employed permitting flow around both the internal and external edges.

In at least one of such prior art developments one of the problems with which the applicant has had to deal, has been recognized. This problem is to obtain a sufficiently high value for the ratio of expansion resistance to compression resistance, in the operation of such shock absorbers. In the French patent to Boge and Sohn, No. 1,065,526, a solution is proposed by the use of perforated valve discs, but this results in a very imperfect solution of the problem, since it brings about a structural complication in this rather simple valving, and furthermore increases the stress on the valve discs, which is a great disadvantage in the case of shock absorbers designed for use in connection with the wheel suspensions of automotive vehicles.

Also in the prior art structure shown in the French Patent 1,244,909 of Bechereau there is described a somewhat similar device which uses either Belleville discs or a rubber disc instead of the annular spring plates of the Boge arrangement. In the arrangement adopted by Bechereau the difficulty encountered by Boge is overcome to some extent, and it is possible to have a considerably increased resistance to expansion for a low resistance to compression; however the Bechereau solution leads necessarily into an operating principle completely different and quite unsound for consideration in an automotive vehicle shock absorber. In the Bechereau device the section of the passage of the liquid during the expansion stroke does not increase as a function of the pressure, but remains constant as soon as the valve is lifted from its seating portion, and is equal to the section of the longitudinal groove 13 formed in the body 12, and it is this section which controls the outward flow of the liquid as described. The result is therefore necessarily an extremely rapid increase (parabolic) of the resistance in function of the speed of expansion, a situation which applicant has recognized as being particularly uncomfortable in the damping of vibrations in the case of an automotive vehicle.

Therefore, in the present development, and also as disclosed to some extent in the applicant's copending applications referred to above, the applicant has solved the problem by the use of a conical surface or more generically a surface of revolution which projects past the internal edge of the valve disc from the inner seat and thus limits the cross-section of the passage presented for the circulation of the liquid during expansion movement, while still permitting the desirable increase of the section as a function of the pressure.

The present application is intended to cover this development as referred to a passage which may or may not be of the nature of a surface of revolution, also to define certain optimum structural conditions for such a passageway.

As a result of both theoretical research and experimental studies conducted by the applicant with respect to variable operating discharge of fluids, the present applicant has demonstrated that, contrary to the belief generally held among the technicians in automotive suspensions and shock absorber work, the curve of resistance in function of the speed of the piston was not enough to fully characterize the specifications of the shock absorber. Two shock absorbers may have practically the same curve of resistance in expansion and compression, when said curve is determined under very particular conditions, and yet they may correspond to a behavior and resulting degree of comfort substantially different for an automotive vehicle. The reason for this is that the resistance of a shock absorber piston is in fact a rather complex function which depends not only on the velocity of the piston, but also upon its acceleration. The present applicant has found that the factor of acceleration is an upsetting factor detrimental to comfort. He has also determined that this acceleration factor increases substantially when there are zones of turbulence in the flow or discharge of the liquid. It is therefore important to reduce as much as possible the arising of turbulence in such discharge.

It is known that turbulence occurs in a discharge of fluid when the Reynolds number reaches a critical value which has been well determined. When the discharge is effected through an aperture of rectangular section, the critical value increases as the width of the rectangle increases. The result is that it is very advantageous to use passages in the form of slits having cross-sections which are quite thin or narrow as compared with their length.

Unfortunately, the resistance to flow through a narrow slit depends rather strongly upon the viscosity of the oil, and consequently upon its temperature, because said resistance comprises a factor of viscosity which is proportional to the length of travel of the liquid during its confinement in the slit, but which is in inverse ratio on the one hand to the large dimension of the slit and on the other hand to the cube of its width. As a result, to obviate this disadvantage, the elongation of the slit measured in the direction of flow of the oil, must be as low as possible.

This analysis is the foundation of the inventive idea involved in the present invention, and has led to the development of the following four requirements, which should be achieved simultaneously within a shock absorber piston of the type described so as to obtain maximum comfort for the suspension of the vehicle.

(1) The cross-section of the passage increases with the pressure in both directions of movement;

(2) The cross-section of the passage is much smaller in the direction of expansion than in that of compression flow;

(3) The control of the passage is constituted by a narrow slit orifice, in both directions of discharge;

(4) The length of the travel of the fluid through the restricted orifice is as small as possible in both directions of discharge.

Thus, in addition to the principal passage afforded by the margins of the valve discs which is shaped like an extremely thin circular slit and is controlled by the flexure of the disc, the invention provides also for permanently open passages permitting relatively unrestricted flow during small movements of the piston. It is also necessary, and provided for by the present invention, to have the above-mentioned qualifications apply to the permanent passageways in the matter of the reduction of turbulence in the discharge of the fluid.

These considerations have led the present applicant to provide slits wherein the length of travel or flow of the fluid is zero or tends practically to zero. This result is achieved by replacing the valve slots, that is the long and narrow passageways previously provided between two parallel surfaces, by an extremely thin passageway between two parallel sharp edges or corners which is quite practical when the permanent passageways are constituted by notches or grooves provided in one or the other of the seating portions of the valve assembly, preferably at the bottom of the downwardly projecting skirt occurring in these present developments.

Thus it will be seen that in FIGURES 1 and 2 of the drawings the piston as a whole is indicated by the reference numeral 10 and comprises the body portion 11 having a central opening through which the narrowed or attenuated upper end 12 of the piston rod 15 extends. The junction between the rod proper and the extension 12 is constituted by a shoulder 16 upon which is seated an internal valve seating member 20 which also fits the rod portion 12 snugly and is clamped by the body portion 11 when the nut 21 is screwed down upon the stem or attenuated portion 12 of the rod. Openings 22 of large capacity pass through the somewhat narrow central portion 23 of the body 11 of the piston and open downwardly into the annular chamber 24 of the piston.

The valve 25 which may consist of one or more thin metal annular plates or discs is provided with an inner edge 26 surrounding the central opening therein and an outer abrupt edge 27. The internal portion of the disc valve 25 surrounds the upper internal portion 30 of the seating member 20 and rests upon the ledge 31 provided thereon.

The outer edge 27 of the valve 25 has its upper surface resting against the inner margin of the skirt 32 of the body portion 11 of the piston, and bearing preferably against a fairly restricted portion of the inner edge of the skirt.

In order to provide inwardly of the disc valve 25 a gradually opening slit for flow upwardly through the piston upon the rebound or expansion stroke, the surface 30 is of gradually diminishing diameter so as to give a gradually widening effect to the orifice upon flexure of the inner portion of the valve 25.

This flow, as suggested at 34 in FIGURE 2 of the drawings, is through a slit bounded upon one side by the displaced inner corner 35 of the lower portion of the valve disc and the surface 30 of the seating member 20 and thus conforms to the principle of minimum flow through a thin orifice as set forth above.

The outer edge of the valve 25 is for the control of the flow downwardly through the piston upon the occurrence of the compression stroke and thus, upon the opening of the exterior portion of the valve, the flow is past the sharp corners 37 of the skirt 32 and between that corner and the slightly displaced upper surface of the outer portion of the valve 25.

Thus in both the inner and outer flow of fluid the requirements listed in the broad description of the present invention are fulfilled.

Now, with respect to the permanent passageways provided for the slight flow in both directions under conditions of short movement of the piston as in boulevard riding, grooves or slots 40 are provided at intervals around the inner wall of the skirt 32. It will be noted that upon occurrence of such flow the liquid passes into and out of the slots or grooves 40 past the sharp edge or corner 42 at the upper portion of the outer periphery of the valve 25. This, of course, fulfills the purposes of the invention also in providing a rather thin passageway of minimum length of flow.

In the embodiment illustrated in FIGURES 4 and 5 of the drawings, the lower edge of the skirt 32' of the piston 10' is provided with grooves or notches 40' the inner wall of which is provided with a ridge or sharp edge or corner as indicated at 45.

Thus here again there tis provided a rather thin or narrow permanent pasageway with a sharp edged margin which decreases the length of flow therethrough thus conforming to the requirement set forth.

The number of permanent by-pass passageways represented by the slots 40 or 40' may be varied in accordance with the conditions present.

In FIGURE 6 of the drawings there is illustrated an embodiment in which the resistance to expansion could be reinforced by the coil spring 50. In this case the only modification in the construction of the body of the piston is the provision of the shoulder at 52 which facilitates the seating of the upper end of the coil spring 50, the lower end of the spring bearing against the upper surface of the inward portion of the valve disc member 25.

It is to be noted that in certain special cases, for example in some inverted motion automobile suspensions, (for example in the Citroen 2CB Renault R4, and others) the stronger resistance must be opposed to the compression motion. It is obvious that in such cases the principle is still valid with the condition that the mounting of the various parts of the piston on the end of the rod must be reversed, in which cases, in all preceding descriptions, the words "expansion" and "compression" should be interchanged.

It is understood that various changes and modifications may be made in the embodiment illustrated and described herein wtihout departing from the scope of the invention as determined by the following claims.

Having thus described the invention, what is claimed as new and desired to be secured by Letters Patent is:

1. In a direct-acting piston-and-cylinder shock absorber, a cylinder containing damping fluid, a piston disposed for reciprocation therein, means for by-passing damping fluid through the piston from one side to the other, said means including an annular cavity formed in said piston and having inner and outer circular walls, at least one thin annular resilient valve disc positioned within said cavity, a fixed annular seat on one wall of said cavity facing in one axial direction and a fixed annular seat on the other of said walls facing in the opposite axial direction, the outer marginal portion of said disc normally seated in the axial direction against the seat on the outer one of said walls, and the inner marginal portion of said disc seated against the seat on the inner one of said walls, whereby movement of said piston in one direction causes pressure of damping fluid against the valve disc in the opposite direction and causes the disc to yieldably flex away from one of said seats and afford an annular passage between the adjacent portions of the disc and the seat for the controlled flow of fluid therethrough, characterized by the fact that the passage controlled by the valve disc is extremely thin as compared with its width, and the length thereof in the direction of flow of the damping fluid is extremely small, the outer circular wall of said piston cavity being in the form of a depending skirt having an annular bottom surface forming the seat against which the outer portion of the valve disc is adapted to rest, and in which there is provided a notch in the lower portion of said skirt providing a permanently open by-pass passageway for restricted flow of damping fluid around the valve disc, angular portions of the said notches cooperating with angular edges of the valve disc to provide the sides of the narrow passages past the piston, the notches in said skirt extending radially all the way through the skirt at the lower edge thereof, and an inner wall of each notch having an annular ridge formed thereon to provide the corner insuring the short length of flow through the restricted opening.

2. In a direct-acting piston-and-cylinder shock absorber, a cylinder containing damping fluid, a piston disposed for reciprocation therein, means for by-passing damping fluid through the piston from one side to the other, said means including an annular cavity formed in said piston and having inner and outer circular walls, at least one thin annular resilient valve disc positioned within said cavity, a fixed annular seat on one wall of said cavity facing in one axial direction and a fixed annular seat on the other of said walls facing in the opposite axial direction, the outer marginal portion of said disc normally seated in the axial direction against the seat on the outer one of said walls, and the inner marginal portion of said disc seated against the seat on the inner one of said walls, whereby movement of said piston in one direction causes pressure of damping fluid against the valve disc in the opposite direction and causes the disc to yieldably flex away from one of said seats and afford an annular passage between the adjacent portions of the disc and the seat for the controlled flow of fluid therethrough, characterized by the fact that the pasage controlled by the valve disc is extremely thin as compared with its width, and the length thereof in the direction of flow of the damping fluid is extremely small, the outer circular wall of said piston cavity being in the form of a depending skirt having an annular bottom surface forming the seat against which the outer portion of the valve disc is adapted to rest, and in which there is provided a notch in the lower portion of said skirt providing a permanently open by-pass passageway for restricted flow of damping fluid around the valve disc, angular portions of the said notches cooperating with angular edges of the valve disc to provide the sides of the narrow passages past the piston, the notch being in only the inner portion of the lower part of the skirt, and the outer diameter of the valve disc being sufficiently smaller than the outer diameter of said skirt to permit at least a portion of the notch to lie radially outwardly of the edge of the disc.

3. In a direct-acting piston-and-cylinder shock absorber, a cylinder containing damping fluid, a piston disposed for reciprocation therein, means for by-passing damping fluid through the piston from one side to the other, said means including an annular cavity formed in said piston and having inner and outer circular walls, at least one thin annular resilient valve disc positioned within said cavity, a fixed annular shoulder on one wall of said cavity facing in one axial direction and a fixed annular shoulder on the other of said walls facing in the opposite axial direction, the outer marginal portion of said disc normally seated in the axial direction against the shoulder on the outer one of said walls and being unconfined laterally at this point, and the inner marginal portion of said disc seated against the shoulder on the inner one of said walls, whereby movement of said piston in one direction causes pressure of damping fluid against the valve disc in the opposite direction and causes the disc to yieldably flex away from one of said shoulders and afford an annular opening between the adjacent portions of the disc and the shoulder for the controlled passage of fluid therethrough, the outer shoulder and the outer portion of the disc being the ones involved in passing the fluid during the compression stroke of the piston and the inner shoulder and inner portion of the disc being the ones involved during the extension or rebound stroke, and the discs comprising the only movable valve elements carried by said piston, one of said circular walls being cut away adjacent the cooperating edge portion of the disc to afford an opening of variable section as the adjacent edge portion of said disc is flexed, and axially extending slots formed in one of the walls of the cavity adjacent the extreme edges of said disc and intersecting said seating shoulder beyond the edge of said disc to form permanently open pasageways.

References Cited by the Examiner

UNITED STATES PATENTS

| 2,320,697 | 6/1943 | Binder | 188—88 |
| 2,521,202 | 9/1950 | Cloudsley | 188—88 |
| 2,668,604 | 2/1954 | Chisholm | 188—88 X |
| 2,676,614 | 4/1954 | Strauss et al. | 188—100 |
| 2,676,676 | 4/1959 | Strauss et al. | 188—88 |
| 2,987,146 | 6/1961 | Allinguant | 188—96 |
| 3,003,597 | 10/1961 | Bourcier de Carbon | 188—88 |
| 3,029,903 | 4/1962 | Wasdell | 188—88 |
| 3,043,404 | 7/1962 | Peras | 188—88 |

FOREIGN PATENTS

| 144,797 | 1/1952 | Australia. |
| 1,065,526 | 1/1954 | France. |
| 838,403 | 5/1952 | Germany. |

MILTON BUCHLER, *Primary Examiner.*

EUGENE G. BOTZ, *Examiner.*

H. R. FIELD, G. E. A. HALVOSA, *Assistant Examiners.*